US009582397B2

(12) United States Patent
Ciocoi et al.

(10) Patent No.: US 9,582,397 B2
(45) Date of Patent: Feb. 28, 2017

(54) METHOD AND SYSTEM FOR OBTAINING RUN-TIME INFORMATION ASSOCIATED WITH EXECUTING AN EXECUTABLE

(75) Inventors: Valentin Ciocoi, Brasov (RO); Teodor Madan, Bucharest (RO); Mihail Nistor, Bucharest (RO)

(73) Assignee: NXP USA, INC., Austin, TX (US)

( * ) Notice: Subject to any disclaimer, the term of this patent is extended or adjusted under 35 U.S.C. 154(b) by 27 days.

(21) Appl. No.: 14/421,273

(22) PCT Filed: Aug. 22, 2012

(86) PCT No.: PCT/IB2012/054245
§ 371 (c)(1),
(2), (4) Date: Feb. 12, 2015

(87) PCT Pub. No.: WO2014/030035
PCT Pub. Date: Feb. 27, 2014

(65) Prior Publication Data
US 2015/0242301 A1 Aug. 27, 2015

(51) Int. Cl.
*G06F 11/36* (2006.01)
(52) U.S. Cl.
CPC ........ *G06F 11/3612* (2013.01); *G06F 11/362* (2013.01); *G06F 11/3636* (2013.01); *G06F 11/3644* (2013.01)
(58) Field of Classification Search
CPC ............... G06F 11/3612; G06F 11/362; G06F 11/3636; G06F 11/3644
USPC ........................................................ 717/131
See application file for complete search history.

(56) References Cited

U.S. PATENT DOCUMENTS

| | | | |
|---|---|---|---|
| 7,707,555 B2* | 4/2010 | Spertus ............... | G06F 11/3664 717/124 |
| 2003/0233634 A1 | 12/2003 | Carrez et al. | |
| 2004/0024868 A1* | 2/2004 | Drummond, II .... | H04L 12/2697 709/224 |
| 2009/0164981 A1 | 6/2009 | Heidasch et al. | |
| 2010/0235810 A1 | 9/2010 | Campbell et al. | |
| 2012/0185829 A1 | 7/2012 | Yaffe | |
| 2014/0235326 A1* | 8/2014 | Paracha ............... | G06Q 10/101 463/25 |

OTHER PUBLICATIONS

International Search Report and Written Opinion correlating to PCT/IB2012/054245 dated Mar. 25, 2013.
(Continued)

*Primary Examiner* — Viva Miller (57) ABSTRACT

A method of obtaining run-time information associated with executing an executable is described. The method comprises receiving an external database comprising one or more external debugging information entries, retrieving the one or more external debugging information entries from the external database and storing the one or more external debugging information entries retrieved from the external database in a debugging information entries collection. The method further comprises providing the debugging information entries collection to a debugging information consumer, and obtaining the run-time information from letting the debugging information consumer retrieve run-time values and format the run-time values according to the external debugging information entries in the debugging information entries collection.

14 Claims, 6 Drawing Sheets

(56) References Cited

OTHER PUBLICATIONS

DWARF: "DWARF Debugging Information Format Version 4", website: http://www.dwarfstd.org/, DWARF Debugging Information Format Committee, Jun. 10, 2010, pp. 1-325.
TIS Committee: "Tool Interface Standard (TIS) Executable and Linking Format (ELF) Specification", Version 1.2, May 1995, pp. 1-106.

* cited by examiner

METHOD AND SYSTEM FOR OBTAINING RUN-TIME INFORMATION ASSOCIATED WITH EXECUTING AN EXECUTABLE

FIELD OF THE INVENTION

This invention relates to a method of obtaining run-time information associated with executing an executable, a system for obtaining run-time information associated with executing an executable, an associated integrated development environment, an associated computer program product and an associated computer readable medium comprising computer-readable information.

BACKGROUND OF THE INVENTION

During design and development of systems with one or more programmable processors and the associated program code to be executed by the programmable processors, designers and developers usually perform extensive testing of the program code at various stages during the design and development. Herein, the designers and developers (hereafter referred to as users) use debuggers, profilers, analyzers and/or visualizers to obtain and inspect run-time information associated with executing an executable. The term executable may herein relate to a program code in a form suitable for execution on the programmable processor, e.g., obtained from compiling and linking a source code. For example, a user may use a debugger to obtain run-time values of e.g. registers, variables, functions, memory locations as defined in the executable as so-called debugging information entries (DIEs) in, for example, the standardized DWARF format. Inspecting and analysing the run-time values allows the user to check the execution of the program code and to, e.g., adapt the program code to improve the program code. If the user needs additional run-time information, the user defines additional DIEs in the source code, compiles and links the source code with the additional DIEs therein, and thereby obtains an executable which, when executed, also provides run-time information for these additional DIEs. The user may subsequently inspect the run-time information, real-time and/or offline, using for example the debugger.

SUMMARY OF THE INVENTION

The present invention provides a method of obtaining run-time information associated with executing an executable, a system for obtaining run-time information associated with executing an executable, an integrated development environment, a computer program product and a computer readable medium comprising computer-readable information as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

The term DWARF relates to a commonly used format for describing programs to facilitate user source level debugging. The description can be generated by compilers, assemblers and linkage editors. It can be used by debuggers and other tools. Reference may be made to the "DWARF Debugging Information Format Version 4", by the DWARF Debugging Information Format Committee, available from http://www.dwarfstd.org and included herein by reference in its entirety.

The term DIE relates to a debugging information entry and may relate to a DIE as defined in the DWARF standard. DWARF uses a series of debugging information entries to define a low-level representation of a source program. Each debugging information entry may comprise an identifying tag and a series of attributes. A debugging information entry may in the current document briefly be referred to as an entry where the context is clear. An entry, or group of entries together, may provide a description of a corresponding entity in the source program. The tag may specify a class to which an entry belongs and the attributes may define the specific characteristics of the entry. DIEs exist in two general types: a DIE of a first type may describe data including data types, while a DIE of a second type may describe a function and other executable code. DIEs may be used in a debugger or in any other application. Such application may be referred to as DIE consumer. A DIE consumer may e.g. be a debugger or a debugger component, a visualizer or a visualizer component, an analyser or an analyser component, a profiler or a profiler component, or a combination of any one or more of these.

The term ELF relates to a commonly used object file format and is an acronym of Executable and Linkable Format (ELF). Reference may be made to "Tool Interface Standard (TIS), Executable and Linking Format (ELF) Specification, Version 1.2" by the Tool Interface Standards (TIS) Committee, included herein by reference in its entirety. Object files in the ELF format may use DIEs to provide descriptions of corresponding entities in a source program.

An object file as referred to in this document may be any type of object file. The ELF standard for example describes three main types of object files: a relocatable file holding code and data suitable for linking with other object files to create an executable or a shared object file, an executable file holding a program suitable for execution and a shared object file holding code and data suitable for linking in two contexts. Herein, in a first context, the link editor may process an object file with other relocatable and shared object files to create another object file. In a second context, a dynamic linker combines an object file with an executable file and other shared objects to create a process image. Created by the assembler and link editor, object files may be binary representations of programs intended to execute directly on a processor, or of programs that have been executed on a processor. Object files may participate in program linking (building a program) and program execution (running a program). Further, a core dump may also be considered as an examples of an object file, and may also be described using ELF.

A file in ELF format may be referred to as an ELF file. An ELF file may comprise an ELF header followed by file data. The file data may include a program header table describing zero or more segments, a section header table describing zero or more sections, and data referred to by entries in the program header table or section header table. Segments may contain information that is necessary for runtime execution of the file, while sections may contain data for linking and relocation. Any byte in the entire file can be owned by at most one section, and there can be orphan bytes which are not owned by any section. The program header table and/or section header table may use DIEs to describe segments and sections.

The term IDE is an acronym of an integrated development environment (IDE) and relates to a software application that provides comprehensive facilities to computer programmers for software development. An IDE may consist of a source code editor, build automation tools and a debugger. An IDE may further comprise a compiler, an interpreter, or both, such as Microsoft Visual Studio or Eclipse. An IDE may further comprise a version control system and various tools to simplify the construction of a GUI. An IDEs may further have a class browser, an object inspector, and a class hierarchy diagram, for use with object-oriented software development. An IDE may thus, for example, provide authoring, modifying, compiling, deploying and debugging software. An example of an IDE is known under the name CodeWarrior, which may be used in developing software that runs on a number of embedded systems.

In this document, the term object file may relate to an object file in ELF format, but may alternatively relate to an object file in any other suitable format. Further, in this document, the term DIE may relate to a DIE as defined in any version of the DWARF standard, but may alternatively relate to a DIE in any other suitable format comprising an identifying tag and one or more attributes providing a description of a corresponding entity in a source program.

Figure 1:
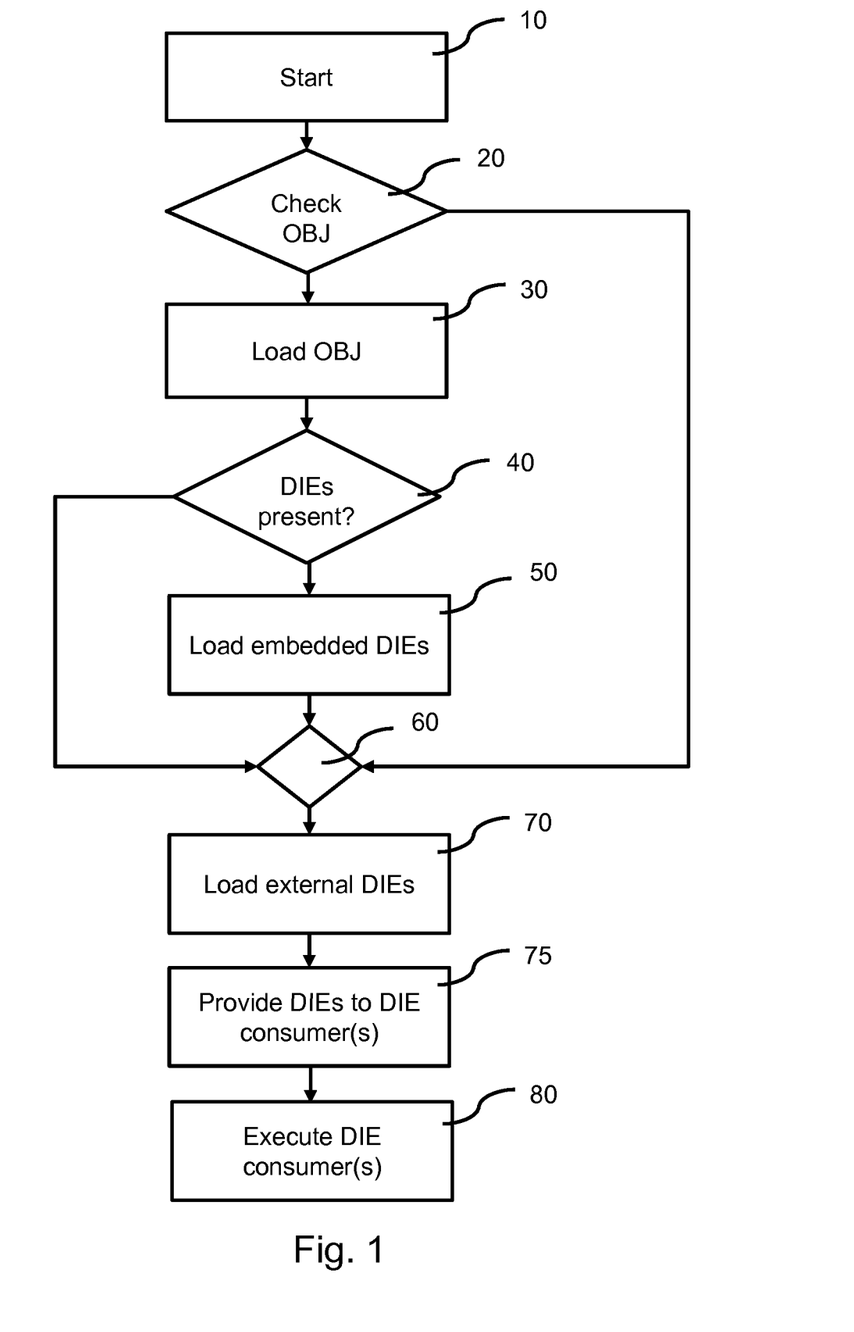
FIG. 1 schematically shows an example of an embodiment of a method.

FIG. 1 schematically shows an example of an embodiment of a method of obtaining run-time information associated with executing an executable. The method may be a computer-implemented method, executed on a processor of a computer system. The method of FIG. 1 will be described together with references to FIG. 4-FIG. 7, which describe examples of further embodiments of stages of the method.

The method starts at a first block 10 comprising initializing any parameters, for example, by allowing a user to provide user input to initialize parameters, for example from presenting a menu to the user whereby the user can browse through an information system to, e.g., for example receive an object file (see FIG. 4, block 321) and/or load the executable into a programmable processor. The object file may be the executable. The object file may additionally be or comprise a shared object file, such as a library of shared program components.

In a second block 20, the method checks whether an object file is available. If no object file is available, the method continues to block 60. This situation may e.g. occur when the method corresponds to a debugging session using a pre-programmed processor of which no object file is available to the user. If an object file is available, the methods proceeds with loading 30 the object file into a memory to make its content directly accessible from the memory. After the object file is loaded into the memory, the method continues to determining 40 whether the object file comprises one or more embedded debugging information entries (DIEs). If the object file does not comprise any embedded DIEs, the method continues to block 60. If the object file comprises one or more embedded DIEs, the method proceeds with loading 50 the DIEs from the object file into a debugging information entries collection (DIEs collection) provided in the memory. Loading 50 the embedded DIEs from the object file comprises retrieving 521 one or more embedded DIEs from the object file, and including 523 the one or more embedded DIEs retrieved from the object file in the DIEs collection (see FIG. 4). If the embedded DIEs are in a different format than the format used for the DIEs on the DIE collection, the method may further comprise a format-conversion 522 of the embedded DIEs to the DIE collection DIE format prior to storing in the DIE collection. The DIE collection may e.g. be in a DWARF format. The method then proceeds to block 60.

Block 60 comprises an entry point accessible from checking 20 whether an object file is available, from determining 40 whether embedded DIEs were present or from loading 50 the embedded DIEs.

Figure 5:
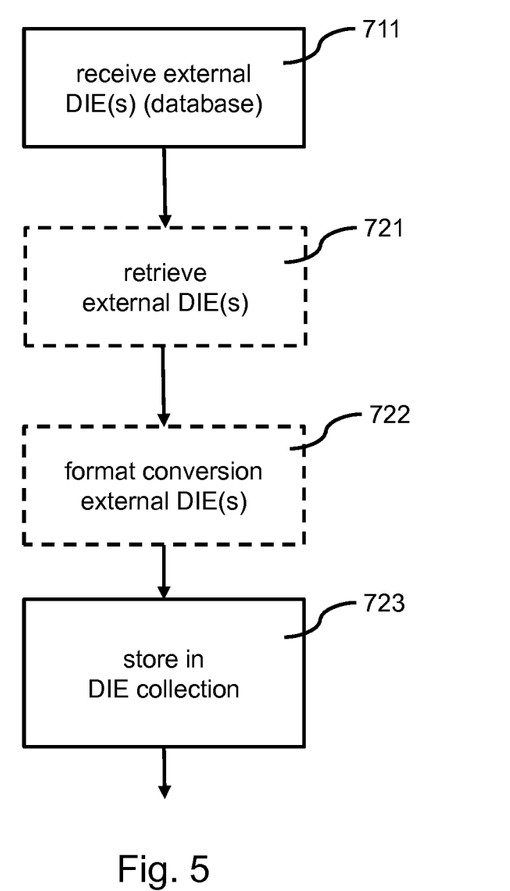

From block 60, the method continues to loading 70 one or more external debugging information entries (external DIEs) 71. The external DIEs may be loaded individually, from a plain text file, and/or from an external database 71D. Such external database 71D may in the following also be referred to as an external DIE database. The loading 70 comprises, as shown in FIG. 5, at least receiving 711 the one or more external DIEs 71 and storing 723 the one or more external DIEs 71 in the DIEs collection 81. If the external DIEs are part of an external database 71D, the loading 70 comprises, as shown in FIG. 5, receiving 711 the external database 71D comprising the one or more external DIEs 71, retrieving 721 the one or more external DIEs 71 from the external database 71D and storing 723 the one or more external DIEs retrieved from the external database 71D in the DIEs collection 81. If the method already loaded embedded DIEs, the external DIEs are thus stored in the DIEs collection alongside the embedded DIEs already loaded therein, in the same DIE collection DIE format. If the method did not load any embedded DIEs, the loading may provide a DIEs collection comprising just the embedded DIEs.

If the external DIEs are in a different format than the format used for the DIEs on the DIE collection, the method may further comprise a format-conversion 722 of the external DIEs to the DIE collection DIE format prior to storing in the DIE collection, as shown in FIG. 5. The external DIEs may e.g. be in an XML format whereas the DIE collection may e.g. use a DWARF format.

Thus, the one or more embedded DIEs may be defined in a first format in the object file, the one or more external DIEs may be defined in a second format, and the one or more embedded DIEs and the one or more external DIES may be stored in the DIE collection in a common format (referred to above as the DIE collection DIE format).

The object file may be defined in an ELF format, wherein the embedded DIEs are defined in the DWARF format.

Herein, the term external DIE relates to a DIE that is defined externally from the object file, and thus not included in the object file as embedded DIEs. The external DIEs may e.g. define complex data types that are not defined in the object file itself, but may have been defined externally from the object file, such as in the external database 71D. One or more of the external DIEs may e.g. be defined by the user.

After the external DIEs are loaded into the DIE collection, where present with the embedded DIEs retrieved from the object file, the method proceeds with providing 75 the DIE collection to a DIE consumer. The DIE consumer may e.g. be a debugger component or another component suitable for obtaining run-time information from an execution of an executable. The DIE consumer thus receives 821 the DIE collection comprising the external DIEs (see FIG. 6).

Figure 6:
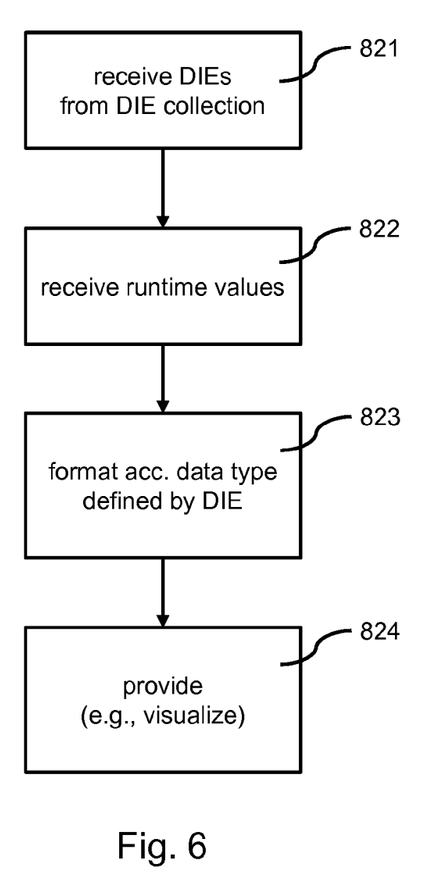

Next, the method proceeds with executing 80 the DIE consumer for obtaining the run-time information from, as shown in FIG. 6, letting the DIE consumer retrieve 822 run-time values and format 823 the run-time values according to the external DIEs in the DIE collection.

Where the object file is an executable, retrieving 822 run-time values may be performed during execution of the executable. Alternatively, the run-time values may be stored, temporary or permanently, in a file or a memory and retrieved from the file or the memory after the execution of the executable is completed. Alternatively or additionally may run-time values relating to memory locations be retrieved from the respective memory locations during, or after, the execution of the executable.

Where the object file is a core dump, retrieving 822 run-time values may be performed from reading the run-time values from the core dump.

Where no executable is available to the user and the execution is performed from letting a pre-programmed processor executing a pre-programmed executable, retrieving 822 run-time values may be performed from retrieving the run-time values during the execution, e.g., from retrieving run-time values relating to memory locations from the respective memory locations during the execution. Alternatively or additionally may run-time values relating to memory locations be retrieved from the respective memory locations after the execution, for example by reading the run-time values directly from the respective memory locations or from a memory dump.

The run-time values may relate to the run-time values from at least one of one or more registers, one or more variables, one or more functions, one or more memory locations in a memory, or a part of a memory corresponding to a memory mapped peripheral.

The external DIE(s) may comprise DIEs having members representing one or more data types and/or one or more global variable and/or one or more local variable and/or one or more register and/or one or more function and/or a mapped part of a memory associated with a memory mapped peripheral.

One or more external DIEs may define a complex data type. An external DIE may define structures or arrays that do not as such exist in the object file. For example, an external DIE may comprise a plurality of fundamental and/or complex data types defined in the executable. An external DIE may further comprise one or more other external DIEs. Hereby, an external DIE may comprise fundamental and/or complex data types defined externally to the executable.

An external DIE may e.g. define a combination of a plurality of fundamental data types defined in the executable. An external DIE may e.g. relate to an array of registers, which are only individually defined as fundamental data types in the executable; this may e.g. allow to present the array of registers in a standard debugger or standard visualizer, as the standard debugger or standard visualizer may obtain the definition of the data type of the array of registers from the external DIE contained in the DIE collection. This may be compared with known visualizers, where additional visualization code would need to be written to be able to present the array in an appropriate format.

An external DIE may e.g. define a data type of an N-bit register in a suitable format. For example, the external DIE may define how to expand an 40-bit result of an multiply-accumulator function as a real number from defining which bits of the 40-bits correspond to the extension bits EXT, which bits correspond to the most significant part MSP and which buts correspond to the least significant part LSP.

An external DIE may e.g. allow to present memory mapped peripherals as architecture specific structures, by using an external DIE that defines a complex data structure corresponding to the mapped memory part associated with the memory mapped peripheral.

Figure 7:
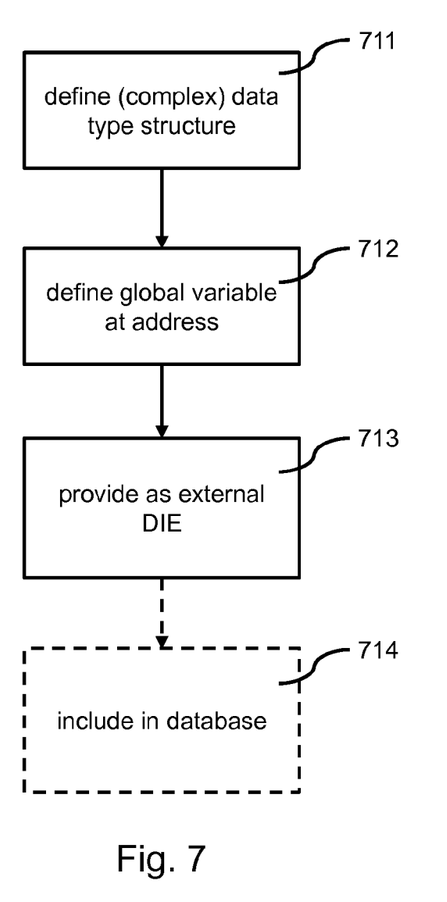

An example of a method for defining such external DIE is shown in FIG. 7. FIG. 7 shows that a user may define 711 a complex data structure whose members represent one or more peripheral internal registers and/or variables e.g. as a vector. The user may then define 712 a global variable at the memory address where the one or more peripheral internal registers and/or variables of the peripheral are memory mapped, allowing to retrieve run-time values of an instantiation of the complex data type structure. The user may then provide 713 the complex data structure and the global variable as an external DIE. The external DIE as defined by the user may be provided to the DIE injector 72 directly for including the external DIE in the DIE collection. Embodiments of the method may thus comprise allowing a user to define at least one of the one or more external DIEs, and storing the external DIEs as defined by the user in the debugging information entries collection. The method may comprise including 714 the external DIE in the external database 71D. Embodiments of the method may thus comprise allowing a user to define at least one of the one or more external DIEs, and storing the external DIEs as defined by the user in the external database 71D.

The one or more external DIEs may e.g. be defined in a DWARF format. The one or more external DIEs may alternatively e.g. be defined in an XML format. A non-limiting, simplified example is given below to illustrate such definitions.

SIMPLIFIED EXAMPLE

As a reference, following fragment C-code illustrates a definition of a structure data type:

```
struct StructDataType
{
    char FirstMember;
    short SecondMember;
    short ThirdMember;
}
```

If this fragment of C-code is compiled, the data type may be encoded in a DWARF format and embedded in the executable debug information as embedded DIE as:

```
...
<1><f4d>: Abbrev Number: 2 (DW_TAG_base_type)
    <f4e> DW_AT_byte_size : 0x1
    <f52> DW_AT_encoding : 6 (signed char)
    <f53> DW_AT_name : char
<1><fdb>: Abbrev Number: 2 (DW_TAG_base_type)
    <fdc> DW_AT_byte_size : 0x2
```

```
    <fe0> DW_AT_encoding : 5 (signed)
    <fe1> DW_AT_name : short
...
<1><107a>: Abbrev Number: 3 (DW_TAG_structure_type)
    <107b> DW_AT_byte_size : 0x5
    <107f> DW_AT_name : StructDataType
<2><108f>: Abbrev Number: 4 (DW_TAG_member)
    <1090> DW_AT_byte_size : 0x1
    <1094> DW_AT_data_member_location: 5 byte block: c 0 0 0 0
    <109a> DW_AT_name : FirstMember
    <109e> DW_AT_type : <0xf4d>
        // this id corresponds to char type previously defined in this
        DWARF
<2><10a2>: Abbrev Number: 4 (DW_TAG_member)
    <10a3> DW_AT_byte_size : 0x2
    <10a7> DW_AT_data_member_location: 5 byte block: c 0 0 0 1
    <10ad> DW_AT_name : SecondMember
    <10b2> DW_AT_type : <0xfdb>
        // this id corresponds to short type previously defined in this
        DWARF
<2><10b6>: Abbrev Number: 4 (DW_TAG_member)
    <10b7> DW_AT_byte_size : 0x2
    <10bb> DW_AT_data_member_location: 5 byte block: c 0 0 0 3
    <10c1> DW_AT_name : ThirdMember
    <10c5> DW_AT_type : <0xfdb>
        // this id corresponds to short type previously defined in this
        DWARF
...
```

If this information is included in the executable as embedded DIE, this embedded DIE may be loaded from the executable into the DIE collection. Based on the DIEs in the DIE collection, a debugger may be able to present the so-defined variables, data types and symbols to a user during a debug session.

If this information is not included in the executable, the data type may be encoded in the DWARF format shown above and be provided as an external DIE. The external DIE may then be loaded into the DIE collection, after which the debugger may be able to present the so-defined variables, data types and symbols to the user during a debug session. In this case, the debugger may or may not be aware that the DWARF-encoded DIE originated from an embedded DIE or from an external DIE.

A corresponding data type may be defined externally in XML and provided in an XML file, the XLM file forming the external data base. For the simplified example, the XML definition may e.g. read:

```
<datatype kind="basic" name="char" size="1" encoding="signed"/>
<datatype kind="basic" name="short" size="2" encoding="signed"/>
...
<datatype kind="struct" name="StructDataType" size="5">
    <member name="FirstMember" type="char" offset="0"/>
    <member name="SecondMember" type="short" offset="1"/>
    <member name="ThirdMember" type="short" offset="3"/>
</datatype>
```

The member types may be defined also externally as in the example above or may refer to types existent in the embedded debug information.

The external DIE as so defined may e.g. be used by debugger tools to display, for example, DSP 40-bit accumulator registers. Herein, the structure's first member FirstMember is the extension EXT, the second member SecondMember is the high part MSP and the third member ThirdMember is the low part LSP of the result of multiply—accumulate operations stored in accumulator registers. The external DIE may further define how the EXT:MSP:LSP are converted in a real number, allowing to present the result in an corresponding format as a real. This presentation mode may be more meaningful for user compared to reading a single 40-bit hexadecimal value.

By using such external DIE, the user may be elevated from the need to define this structure in the program code of all DSP applications having 40-bit accumulator registers and accordingly from the need to re-compile his applications to obtain the information as embedded DIE in order to see the accumulator registers in a more meaningful way. Further, if the source code would not be available to the user, the user would not be able to modify the source code and the user may not be able to obtain an executable with the DIE information embedded in the executable as embedded DIE. In such case user could define the information as external DIE to help him debug the application.

Figure 2:
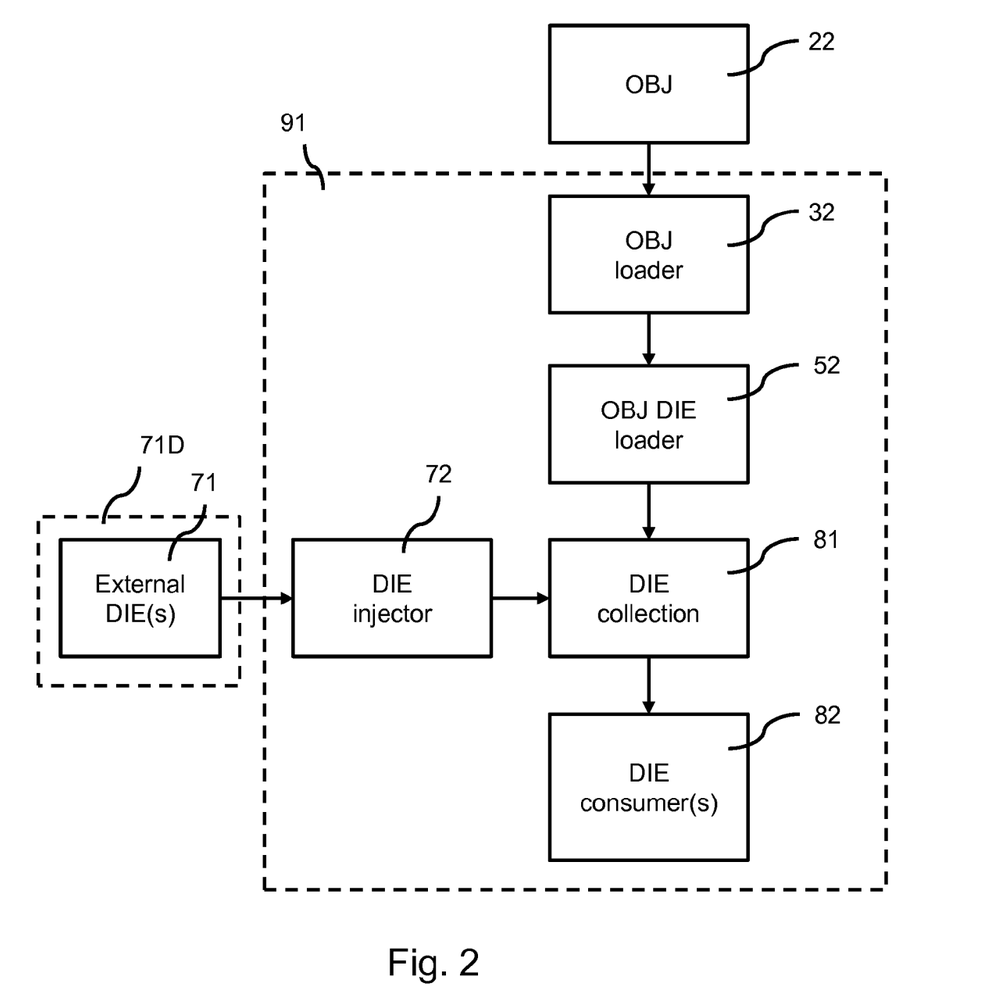
FIG. 2-FIG. 3 schematically show examples of embodiments of a system.

FIG. 2 schematically shows an example of embodiments of a system for obtaining run-time information associated with executing an executable. The system 91 may be an integrated development environment 91 allowing a user to edit, compile and link his program code and to debug the program code using a simulation of its execution. The system 91 may alternatively be, for example, a debugger.

The system 91 comprises an object file loader 32, a DIE loader 52, a DIE injector 72, a DIE collection memory 81 for storing a DIE collection and one or more DIE consumer 82. The system is arranged to receive an object file 22 and one or more external DIEs 71. The one or more external DIEs may be provided as part of an external DIE database 71D. The one or more DIE consumers 82 are arranged to obtain run-time information associated with executing the object file as an executable. The DIE collection and the DIE collection memory may be referred to with the same reference symbol 81.

The object file loader 32 is arranged to receive an object file 22. The DIE loader 52 is arranged to receive the object file 22 from the object file loader 32 and determine whether the object file 22 comprises one or more embedded DIEs. The DIE loader 52 is arranged to, where the object file 22 comprises one or more embedded DIEs, retrieve one or more embedded debugging information entries from the object file and include the one or more embedded debugging information entries retrieved from the object file in the DIEs collection 81.

The DIE injector 72 is arranged to receive the external DIEs 71. The DIE injector 72 is arranged to store the one or more external DIEs 71 in the DIE collection 81. The DIE injector 72 is arranged to, where an external DIE database 71D is provided comprising the one or more external DIEs 71, retrieve the one or more external DIEs 71 from the external database 71D, and to store the one or more external DIEs retrieved from the external database in the DIE collection 81. In the following non-limiting description, the situation will be discussed where the external DIEs are included in an external database 71D, but the external DIEs may alternatively be provided in another suitable form—such as individually or in a plain text file-.

The one or more DIE consumers 82 are arranged to receive the DIE collection 81, to obtain the run-time information from retrieving run-time values and to format the run-time values according to the one or more external DIEs in the DIE collection 81.

DIE consumers 82 may be arranged to, in retrieving run-time values, retrieve the run-time values from at least one of one or more registers, one or more variables, one or more functions, one or more memory locations in a memory, a part of a memory corresponding to a memory mapped peripheral.

DIE consumers 82 may thus be arranged to, in retrieving run-time values, retrieve the run-time values from an execution of the executable, where the executable may correspond to the object file 22.

The one or more DIE consumers 82 may comprise at least one of a debugger, a debugger component, a profiler, a profiler component, a data formatter, a data formatter component, a visualizer and a visualizer component.

The one or more DIE consumers 82 may, together with the object file loader 32, the DIE loader 52, the DIE injector 72 and the DIE collection memory 81, form a debugger, a profiler or a visualizer.

The system 91, or one or more of its components, may further be arranged to perform any of the methods described above.

The system 91 may allow a user to obtain run-time information of any complex data structure according to a DIE that is not present in the object file 22 without the need to modify the source code and obtain a new object file wherein the DIE is included from compiling the modified source code, and without the need to change the system 91 itself (as would be the case when e.g. using a visualizer in Microsoft Visual Studio 201 or the Pretty Printer of the GNU symbolic debugger GDB). The system 91 may allow the user to obtain run-time information of such any complex data structure by providing a definition of the complex data structure in an external DIE, for example included in an external DIE database 71D. The external DIEs 71 and the external DIE database 71D may be partially or fully defined by the user, or obtained from a commercial vendor, such as a commercial vendor of the system 91 or a third-party vendor.

Figure 3:
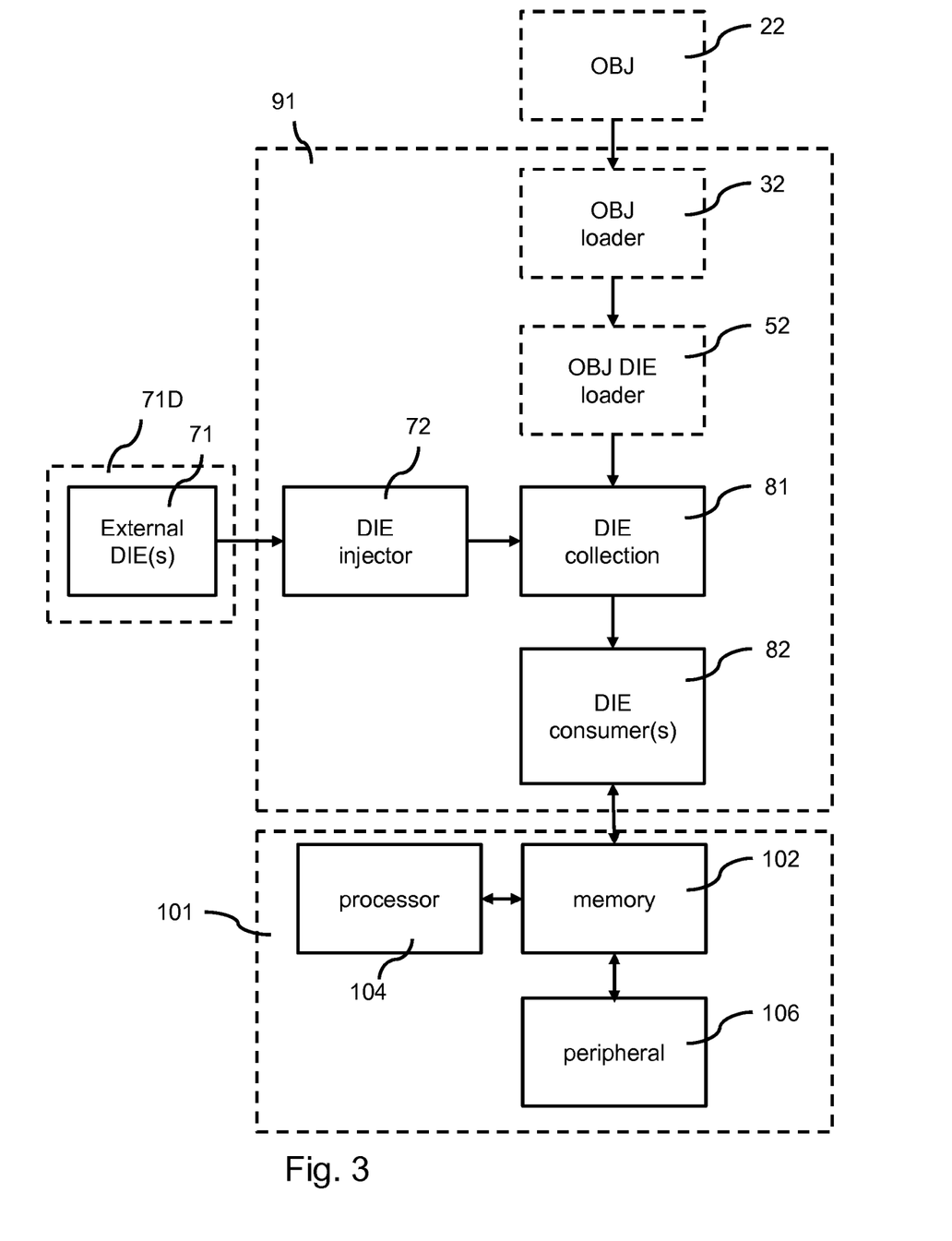
Figure 4:
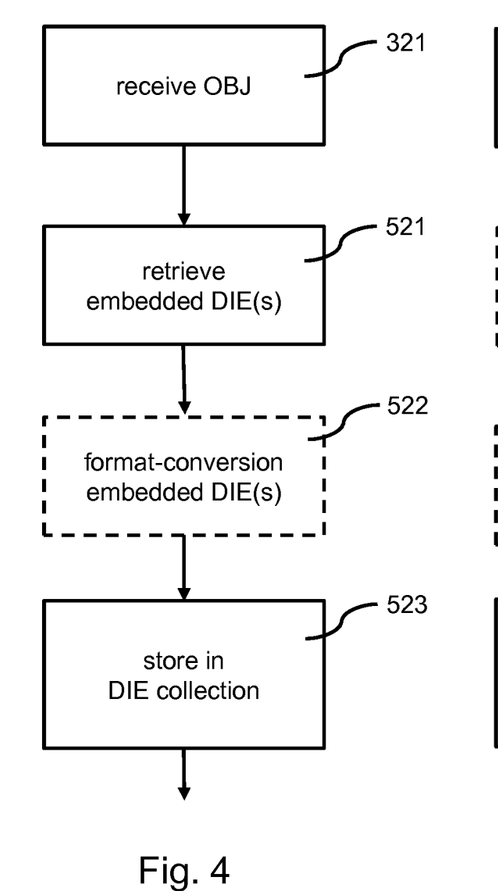
FIG. 4-FIG. 7 schematically show details of embodiments.

FIG. 3 schematically shows an example of another embodiment of a system for obtaining run-time information associated with executing an executable, FIG. 3 shows an example of a system 91 forming an integrated development environment 91 allowing a user to edit, compile and link his program code, to debug the program code using a simulation of its execution, and also to debug the program code while executing the executable obtained from the program code on processor 104 of a hardware board 101 connected via a processor memory 102 to the debugger or another DIE consumer 82 of the system 91. The system 91 may alternatively be, for example, a debugger.

The embodiment shown in FIG. 3 differs from the embodiment shown in FIG. 2 in that the embodiment shown in FIG. 3 is arranged to obtaining run-time information associated with executing an executable, where the executable is loaded in a processor connected to the system. The executable may be available to the user and provided as object file 22 to the system 91, allowing the system to load embedded DIEs from the executable as described with reference to FIG. 2. If the executable is available to the user, the system may allow the user to load the executable in the processor 104 or its processor memory 102, allowing the processor to execute the executable; such loading may also be referred to a programming. The executable may not be available to the user, but pre-programmed in the processor 104 or its processor memory 102. In the latter case, the system may not be able to load embedded DIEs from the executable; the system may then only use the external DIEs 71, as e.g. available from the external DIE database 71D.

The hardware board 101 may further comprise a memory mapped peripheral 106 associated with part of the processor memory 102. Some of the run-time values may relate to the run-time values from the part of the processor memory 102 corresponding to the memory mapped peripheral 106.

Some of the external DIE(s) may comprise DIEs having members representing at least part of the mapped part of the processor memory 102 associated with a memory mapped peripheral 106.

The system 91, or one or more of its components, may further be arranged to perform any of the methods described above.

The system 91 of FIG. 3 may hereby allow the user to obtain run-time values of at least one of one or more registers, one or more variables, one or more functions, one or more memory locations in the processor memory 102 as used by the processor 104 during the execution of the executable. The system 91 of FIG. 3 may hereby further allow the user to obtain run-time values of at least one of one or more registers, one or more variables, one or more functions, one or more memory locations in the processor memory 102 as used by the memory-mapped peripheral 106 during the execution of the executable.

The system 91 may thus allow a user to obtain run-time information of any complex data structure(s) by using one or more external DIEs defining such complex data structure(s), without the need to change the system itself. The one or more external DIEs 71 may be part of an external DIE database 71D. The one or more external DIEs 71 and/or the external DIE database 71D may e.g. be partially or fully defined by the user, obtained from a commercial vendor of the system 91, obtained from a commercial vendor of the memory-mapped peripheral, or obtained from a third-part vendor.

FIG. 2 and FIG. 3 thus show examples of systems which may retrieve the run-time values from executing the executable. The retrieval may be performed real-time, via a memory dump into a file accessible by the one or more DIE consumers, or via a simulation. Additionally or alternatively may run-time values be retrieved from a memory and/or from a part of a memory corresponding to a memory mapped peripheral.

Figure 8:
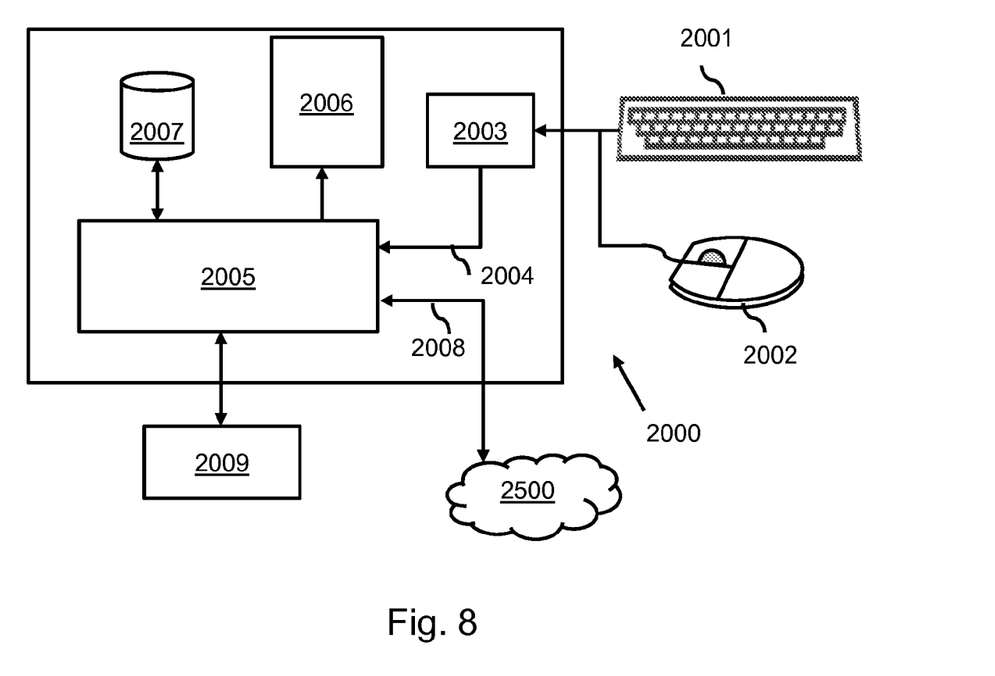
FIG. 8 schematically shows an exemplary user interaction system.

FIG. 8 schematically shows an exemplary user interaction system 2000 having a programmable processor 2005. The user interaction system 2000 is shown to be a personal computer, but may be any type of suitable user interaction system 2000. The user interaction system 2000 may provide an integrated development environment IDE. The programmable processor may comprise one or more components of system 91. The user interaction system 2000 further comprises a storage unit 2007, a user input 2003 and a display 2006. The user input 2003 allows the user to input user data and user instructions 2004 to the processor 2005 by e.g. using a keyboard 2001 or a mouse 2002. Also, although not shown, the display 2006 may comprise a touch-sensitive surface for enabling the user to provide user data and user instructions to the user input 2003 by means of touching the display 2006. The processor 2005 is arranged to perform any one of the methods according to the invention, to receive user data and user instructions 2004, to present visual information on the display 2006 and to communicate with a data I/O device 2009, such as an optical disc drive or a solid state reader/writer. The processor 2005 is arranged to cooperate with the storage unit 2007, allowing storing and retrieving information on the storage unit 2007, such as storing and retrieving the external DIEs 71 and/or the external database 71D and/or the object file 22 and/or a memory dump obtained from an execution of the executable or a simulation thereof. The user interaction system 2000 may further comprise a communication channel 2008 allowing the processor 2005 to connect to an external cloud 2500 for communicating with other devices in the cloud. The external cloud may e.g. be the Internet. The processor 2005 may be capable to read, using the data I/O device 2009, a computer readable medium comprising a program code. The processor 2005 may be capable to read, using the data I/O device 2007, a computer readable medium comprising a computer program product comprising instructions for causing the user interaction system 2000 to perform a method of obtaining run-time information associated with executing an executable. The method comprises receiving one or more external debugging information entries. The method may comprise receiving an external database comprising the one or more external debugging information entries. The method may comprise retrieving the one or more external debugging information entries from the external database. The method may comprise storing the one or more external debugging information entries in a debugging information entries collection. The method may comprise providing the debugging information entries collection to a debugging information consumer. The method may comprise obtaining the run-time information from letting the debugging information consumer retrieve run-time values and format the run-time values according to the external debugging information entries in the debugging information entries collection. The method may comprise receiving an object file, determining whether the object file comprises one or more embedded debugging information entries, and where the object file comprises one or more embedded debugging information entries, retrieving one or more embedded debugging information entries from the object file, and including the one or more embedded debugging information entries retrieved from the object file in the debugging information entries collection. The method may comprise further actions as described with reference to FIG. 1-FIG. 7.

Figure 9:
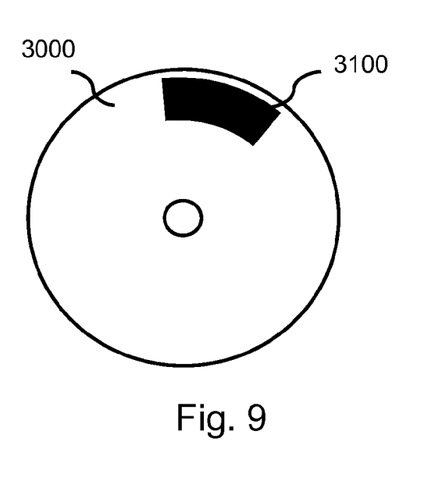
FIG. 9 schematically shows a computer readable medium comprising a computer program product.

FIG. 9 schematically shows a computer readable medium 3000 comprising a computer program product 3100, the computer program product 3100 comprising instructions for causing a processor apparatus to perform a method of obtaining run-time information associated with executing an executable. The method comprises receiving one or more external debugging information entries. The method may comprise receiving an external database comprising the one or more external debugging information entries. The method may comprise retrieving the one or more external debugging information entries from the external database. The method may comprise storing the one or more external debugging information entries in a debugging information entries collection. The method may comprise providing the debugging information entries collection to a debugging information consumer. The method may comprise obtaining the run-time information from letting the debugging information consumer retrieve run-time values and format the run-time values according to the external debugging information entries in the debugging information entries collection. The method may comprise receiving an object file, determining whether the object file comprises one or more embedded debugging information entries, and where the object file comprises one or more embedded debugging information entries, retrieving one or more embedded debugging information entries from the object file, and including the one or more embedded debugging information entries retrieved from the object file in the debugging information entries collection. The method may comprise further actions as described with reference to FIG. 1-FIG. 7. The computer program product 3100 may be embodied on the computer readable medium 3000 as physical marks or by means of magnetization of the computer readable medium 3000. However, any other suitable embodiment is conceivable as well. Furthermore, it will be appreciated that, although the computer readable medium 3000 is shown in FIG. 9 as an optical disc, the computer readable medium 3000 may be any suitable computer readable medium, such as a hard disk, solid state memory, flash memory, etc., and may be non-recordable or recordable.

The invention may thus also be implemented in a computer program for running on a programmable apparatus, at least including code portions for performing steps of a method according to the invention when run on a programmable apparatus, such as a computer system, or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a, transitory or non-transitory, tangible medium or data carrier, such as a CD-rom or diskette, stored with data loadable in a memory of a programmable apparatus, the data representing the computer program.

Figure 10:
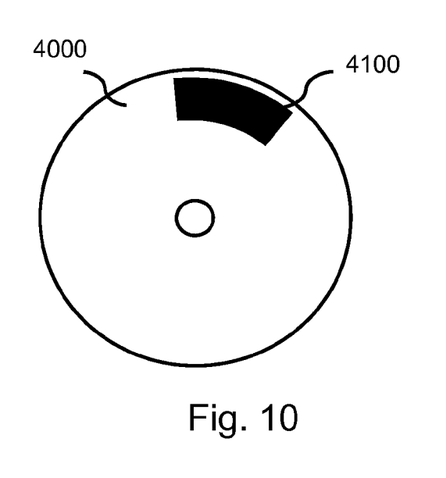
FIG. 10 schematically shows a computer readable medium comprising information.

FIG. 10 schematically shows a computer readable medium 4000 comprising computer readable information 4100. The computer readable information 4100 comprises one or more external DIEs 71. The computer readable information 4100 may comprise an external database 71D comprising the one or more external DIEs 71. The one or more external DIE(s) may comprise DIEs having members representing one or more data types and/or one or more global variable and/or one or more local variable and/or one or more register and/or one or more function and/or a mapped part of a memory associated with a memory mapped peripheral. The one or more external DIEs may be in a DWARF format in an XLM format, a first other format comprising describing data including data types, a second other format describing a function and other executable code, or in any other suitable format suitable for a system 91 according to an embodiment. The computer readable medium 4000 may be a data carrier, such as a CD-rom or diskette, stored with the computer-readable information 4100. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the system implementing the present invention is, for the most part, composed of units known to those skilled in the art, details of such units will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 2 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 2000, for example, from computer readable media such as memory 3000 or other media on other computer systems. Such computer readable media may be permanently, removably or remotely coupled to an information processing system such as system 2000. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 2000 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device.

However, other modifications, variations and alternatives are also possible. The specifications and drawings are, accordingly, to be regarded in an illustrative rather than in a restrictive sense.

Features described with reference to one example may be combined with features described with reference to another example to obtain further examples or embodiments. Features described with reference to one or more methods may correspondingly be implemented with one or more systems, devices and computer program products, and vice versa.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of obtaining run-time information associated with executing an executable, the method comprising:
  receiving an object file while executing the executable;
  determining whether the object file comprises one or more embedded debugging information entries, and
  where the object file comprises one or more embedded debugging information entries:
    retrieving one or more embedded debugging information entries from the object file, and
    including the one or more embedded debugging information entries retrieved from the object file in a debugging information entries collection;
  receiving one or more external debugging information entries from an external database, wherein the one or more external debugging information entries relates to an array of registers;
  storing the one or more external debugging information entries in the debugging information entries collection;
  providing the debugging information entries collection to a debugging information consumer; and
  obtaining the run-time information from at least one or more registers, one or more variables, one or more functions, one or more memory locations, for executing the executable, and letting the debugging information consumer retrieve run-time values and format the run-time values according to the external debugging information entries in the debugging information entries collection; and
  presenting a visualization of the run-time values as formatted according to the external debugging information entries.

2. The method according to claim 1, wherein the object file comprises an executable.

3. The method according to claim 1, wherein the object file comprises a library.

4. The method according to claim 1, wherein
  the one or more external debugging information entries is provided in the external database;
  the receiving of the one or more external debugging information comprising receiving the external database comprising the one or more external debugging information entries; and
  the method further comprises retrieving the one or more external debugging information entries from the external database.

5. The method according to claim 1, the method further comprising:
  providing a user interface to receive one or more user provided external debugging information entries; and
  storing the user provided external debugging information entries as defined by the user in the debugging information entries collection.

6. The method according to claim 1, wherein the one or more external debugging information entries comprise one or more of debugging information entries having members representing one or more data types, one or more global variables, one or more local variables, one or more register, one or more function, or a mapped part of a memory associated with a memory mapped peripheral.

7. The method according to claims 1, at least one of the one or more external debugging information entries defining a complex data type.

8. The method according to claim 1, wherein the run-time values are retrieved from a part of a memory corresponding to a memory mapped peripheral.

9. A method of generating run-time information while executing an executable, the method comprising:
  receiving an object file while executing the executable;
  retrieving embedded debugging information entries (DIE) from object file;
  formatting the embedded DIE to have a predetermined format;
  retrieving external DIE from an external memory, wherein the one or more external DIE relates to an array of registers;
  formatting the external DIE to have the predetermined format;
  storing the embedded DIE and the external DIE in a DIE collection in a debugging information consumer;
    obtaining the run-time information from at least one or more registers, one or more variables, one or more functions, one or more memory locations, for executing the executable, and letting the debugging information consumer retrieve run-time values and format the run-time values according to the external debugging information entries in the debugging information entries collection; and
  presenting a visualization of the run-time values as formatted according to the external debugging information entries.

10. A computer system for obtaining run-time information associated with executing an executable on a processor, the computer system comprising:
  an object file loader arranged to receive an object file while executing the executable, retrieve one or more debugging information entries (DIE) from the object file, and store the one or more debugging information entries in a debugging information entries collection, wherein if the debugging information entries are in a different format than the format used for entries in the debugging information collection, format the debugging information entries to the entries in the debugging information entries collection;
  a DIE injector arranged to:
    receive one or more external debugging information entries from an external memory at runtime, wherein the one or more external debugging information entries relates to an array of registers, and
    store the one or more external debugging information entries in the debugging information entries collection; and
  a DIE consumer arranged to:
    receive the debugging information entries collection,
    obtain the run-time information from at least one or more registers, one or more variables, one or more functions, one or more memory locations, for executing the executable, and letting the debugging information consumer retrieve run-time values and format the run-time values according to the external debugging information entries in the debugging information entries collection;
    format the run-time values according to the external debugging information entries received from the debugging information entries collection; and
    present a visualization of the run-time values as formatted according to the external debugging information entries.

11. The computer system according to claim 10, the computer system further comprising:
  an object file loader arranged to receive an object file, wherein the object file comprises one or more embedded debugging information entries; and a DIE loader arranged to:
receive the object file from the object file loader,
retrieve one or more of the embedded debugging information entries from the object file, and
include the one or more of the embedded debugging information entries retrieved from the object file in the debugging information entries collection.

12. The computer system according to claim 10, the DIE consumer arranged to retrieve the run-time values from at least
a part of a memory corresponding to a memory mapped peripheral.

13. The computer system according to claim 10, the DIE consumer comprising at least one of a debugger, a debugger component, a profiler, a profiler component, a data formatter, a data formatter component, a visualizer and a visualizer components.

14. An integrated development environment comprising the computer system according to claim 10.

* * * * *